(12) United States Patent
Croce et al.

(10) Patent No.: US 11,980,146 B2
(45) Date of Patent: May 14, 2024

(54) AGRICULTURAL PHOTOVOLTAIC STRUCTURE WITH CONTROLLED COOLING

(71) Applicant: TEP RENEWABLES Ltd., Warwickshire (GB)

(72) Inventors: Maurizio Croce, Pesaro (IT); Stefano Calabro', Birmingham (GB)

(73) Assignee: TEP RENEWABLES LTD, Warwickshire (GB)

( * ) Notice: Subject to any disclaimer, the term of this patent is extended or adjusted under 35 U.S.C. 154(b) by 0 days.

(21) Appl. No.: 17/679,217

(22) Filed: Feb. 24, 2022

(65) Prior Publication Data
US 2023/0148487 A1 May 18, 2023

(30) Foreign Application Priority Data
Nov. 16, 2021 (IT) .................. 102021000029009

(51) Int. Cl.
| | | |
|---|---|---|
| *A01G 9/24* | (2006.01) | |
| *A01G 7/00* | (2006.01) | |
| *A01G 13/02* | (2006.01) | |
| *F21V 23/04* | (2006.01) | |
| *H02S 40/42* | (2014.01) | |

(52) U.S. Cl.
CPC .............. *A01G 9/243* (2013.01); *A01G 7/00* (2013.01); *A01G 9/247* (2013.01); *A01G 9/249* (2019.05); *A01G 13/0206* (2013.01); *F21V 23/0464* (2013.01); *H02S 40/425* (2014.12)

(58) Field of Classification Search
CPC ........ A01G 9/243; A01G 9/247; A01G 9/249; A01G 13/0206; A01G 7/00; H02S 40/425; F21V 23/0464
See application file for complete search history.

(56) References Cited

U.S. PATENT DOCUMENTS

| | | | |
|---|---|---|---|
| 7,162,833 B2 | 1/2007 | Faris | |
| 8,429,861 B2 * | 4/2013 | Conger | ................... H02S 20/32 52/146 |

(Continued)

FOREIGN PATENT DOCUMENTS

| | | | |
|---|---|---|---|
| CN | 207995729 | 10/2018 | |
| WO | WO-2011047828 A1 * | 4/2011 | ............. A01G 9/243 |

*Primary Examiner* — Monica L Perry
*Assistant Examiner* — Aaron M Rodziwicz
(74) *Attorney, Agent, or Firm* — Jacobson Holman PLLC

(57) ABSTRACT

An agricultural photovoltaic structure (1) is described comprising at least one support structure (2), photovoltaic panels (3) and glass (4) supported by the support structure (2), irrigation means (7) for an underlying agricultural land (6), lighting means (5) of the underlying agricultural land (6), and control means. The support structure (2) comprises at least one frame (23) able to support, side by side, both the photovoltaic panels (3) and the glasses (4), implementing a cover over the agricultural land (6) partly suitable for diffusing light over the underlying agricultural land (6) by the glass (4), The irrigation means (7) include nozzles able to wet the lower part of the photovoltaic panels (3) thus cooling them, the water then falling by gravity onto the agricultural land (6). The control means are able to activate the irrigation means (7) and the lighting means (5) on the basis of sensors.

4 Claims, 2 Drawing Sheets

(56) References Cited

U.S. PATENT DOCUMENTS

| | | | | |
|---|---|---|---|---|
| 8,453,659 | B2* | 6/2013 | Li | A45B 25/00 |
| | | | | 361/679.02 |
| 8,468,741 | B2* | 6/2013 | Lewis | A01G 9/1423 |
| | | | | 47/17 |
| 9,801,346 | B2 | 10/2017 | Iwai | |
| 10,130,047 | B2* | 11/2018 | Surany | F24S 25/617 |
| 10,624,275 | B1* | 4/2020 | Lewis | A01G 9/247 |
| 11,337,379 | B2* | 5/2022 | James | A01G 9/26 |
| 2005/0091916 | A1* | 5/2005 | Faris | A01G 25/00 |
| | | | | 47/79 |
| 2005/0105970 | A1* | 5/2005 | Faris | E03B 3/03 |
| | | | | 405/41 |
| 2008/0148631 | A1* | 6/2008 | Wan | A01G 13/0206 |
| | | | | 47/20.1 |
| 2014/0028242 | A1* | 1/2014 | Akin | H02J 7/35 |
| | | | | 320/101 |
| 2014/0261596 | A1* | 9/2014 | Nallakrishnan | A01G 13/0212 |
| | | | | 135/96 |
| 2017/0126172 | A1* | 5/2017 | Nogier | F24S 30/425 |
| 2018/0325044 | A1* | 11/2018 | Tilley | A01G 17/06 |
| 2020/0253133 | A1* | 8/2020 | Lewis | A01G 9/24 |
| 2022/0217920 | A1* | 7/2022 | Venusio Tamburrino | |
| | | | | F24S 23/77 |

* cited by examiner

AGRICULTURAL PHOTOVOLTAIC STRUCTURE WITH CONTROLLED COOLING

BACKGROUND IN THE INVENTION

The present invention relates to an agricultural photovoltaic structure with controlled cooling.

In the "2020 World Population Data Sheet", PBR (Population Reference Bureau) estimated that the global population would increase from 7.8 billion in 2020 to 9.9 billion in 2050. This increase (about 25%) will result in an increase in the resources and goods to be produced, including food, water, energy. Each of these, with different contributions, will lead to an increase in greenhouse gas emissions, radiative forcing and, consequently, global warming. As reported by the United Nations in "Fast Facts" in relation to the increase in average global temperatures, the Earth is about 1.1° C. warmer than the average global temperature during the preindustrial age.

Unfortunately, again according to the United Nations, if the current trend of greenhouse gas emissions were to continue, this increase in average global temperature would reach +4.4° C. in 2100. A value, which is far higher than that +1.5° C. (COP21 Paris Conference), considered to be the maximum limit of increase in the average global temperature to avoid the worst consequences of climate change (such as drought, flooding and other extreme weather conditions).

Therefore, it is necessary to aim at systems with renewable sources. To this end, as reported in the "Energy Roadmap to 2050", in order to achieve the EU's objective of reducing greenhouse gas emissions by 80-95% by 2050, about two thirds of the energy in Europe will have to come from systems with renewable sources and the production of electricity will have to be almost devoid of emissions, even though an even greater demand is expected than today. However, this must be done without taking land away from agriculture, which is needed, in turn, to satisfy the increase in global food requirements.

By combining the need to reduce greenhouse gas emissions, with the need to increase agricultural food production and protect it from extreme weather events, which will gradually become more and more frequent, as the United Nations has highlighted several times, one of the solutions that can be adopted is photovoltaic technology applied to agriculture, also referred to as agricultural photovoltaic technology, or simply agrivoltaics.

Agrivoltaic technologies mean all those solutions, which allow using the same portion of land both for producing electricity by means of systems with renewable solar sources and for agricultural food production, by optimizing the two results.

CN-207995729 describes a photovoltaic system for agricultural use comprising a combination of photovoltaic panels and panels able to diffuse light.

U.S. Pat. No. 9,801,346 describes a cultivation system comprising a cover with photovoltaic panels and see-through panels able to diffuse light to favor the underlying crops; the system also comprises irrigation means (column 8, line 40; column 10, lines 7-12).

U.S. Pat. No. 7,162,833 shows a photovoltaic system with irrigation means able to wet both the photovoltaic panels and the underlying crops (column 3, lines 6-23; FIG. 3A).

Disadvantageously, the suggested technical solutions combining different technologies, are complex to build and keep efficient.

Furthermore, the maintenance requires technical skills, which are not common in farmers.

SUMMARY OF THE INVENTION

It is the object of the present invention to produce an agricultural photovoltaic structure able to transform solar energy into electricity, which is also useful for cultivating the land underlying the structure.

It is a further object of the present invention that the agricultural photovoltaic structure comprises means able to control the exposure of the photovoltaic panels in synergy with the cultivation requirements of the agricultural land.

It is an even further object of the present invention that the agricultural photovoltaic structure is simple to make and minimally invasive of the agricultural land.

According to the invention, said objects and further objects are achieved with an agricultural photovoltaic structure comprising at least one support structure, photovoltaic panels and glass supported by said support structure, irrigation means of an underlying agricultural land, lighting means of the underlying agricultural land, and control means, characterized in that the support structure comprises at least one frame able to support, side by side, both the photovoltaic panels and the glass implementing a cover over the agricultural land partly suitable for diffusing light on the underlying agricultural land by the glass (4), wherein the irrigation means include nozzles able to wet the lower part of the photovoltaic panels thus cooling them, the water then falling, by gravity, on the agricultural land, wherein the control means are able to activate the irrigation means and the lighting means on the basis of sensors.

Advantageously, therefore, the cooling of the panels allows increasing both the efficiency and the producibility of the system by about 0.35% for every ° C. (degree centigrade): by lowering the temperature of the panels from 50° C. to 35° C., for example, there is an increase in production of more than 5%.

The water, which was used to cool the panels, will then fall to the ground, irrigating the crops present. The use of water for the benefit of the photovoltaic system does not imply any additional expense for water since the same water would nonetheless have been used for agricultural purposes.

The innovative combination of different technologies operating automatically by virtue of the wide network of sensors and the management thereof of the control means, ensures that the agricultural photovoltaic structure is capable of:

producing electricity from a renewable source to reduce the greenhouse gas emissions, reducing, but only in a non-significant manner, the cultivatable surface of the land;

increasing the agricultural production by providing natural diffused light, and artificial light, if necessary, for all types of crops situated below the structures, which do not favor an excessive amount of direct sunlight;

protecting the agricultural production of all types of crops from extreme weather events, e.g., hail;

diminishing excessive evaporation of the crops underlying the structures and those between the structures, consequently reducing the need thereof for irrigation water;

cooling the panels, with a consequent increase in the electricity production thereof during crop irrigation;

also cultivating those lands, which are no longer suitable for cultivation due to drought, and those which are potentially at risk as a result of climate change.

DESCRIPTION OF THE DRAWINGS

These and other features of the present invention will be more apparent from the following detailed description of practical embodiments thereof, shown by way of non-limiting example in the accompanying drawings, in which.

DETAILED DESCRIPTION OF THE INVENTION

Figure 1:
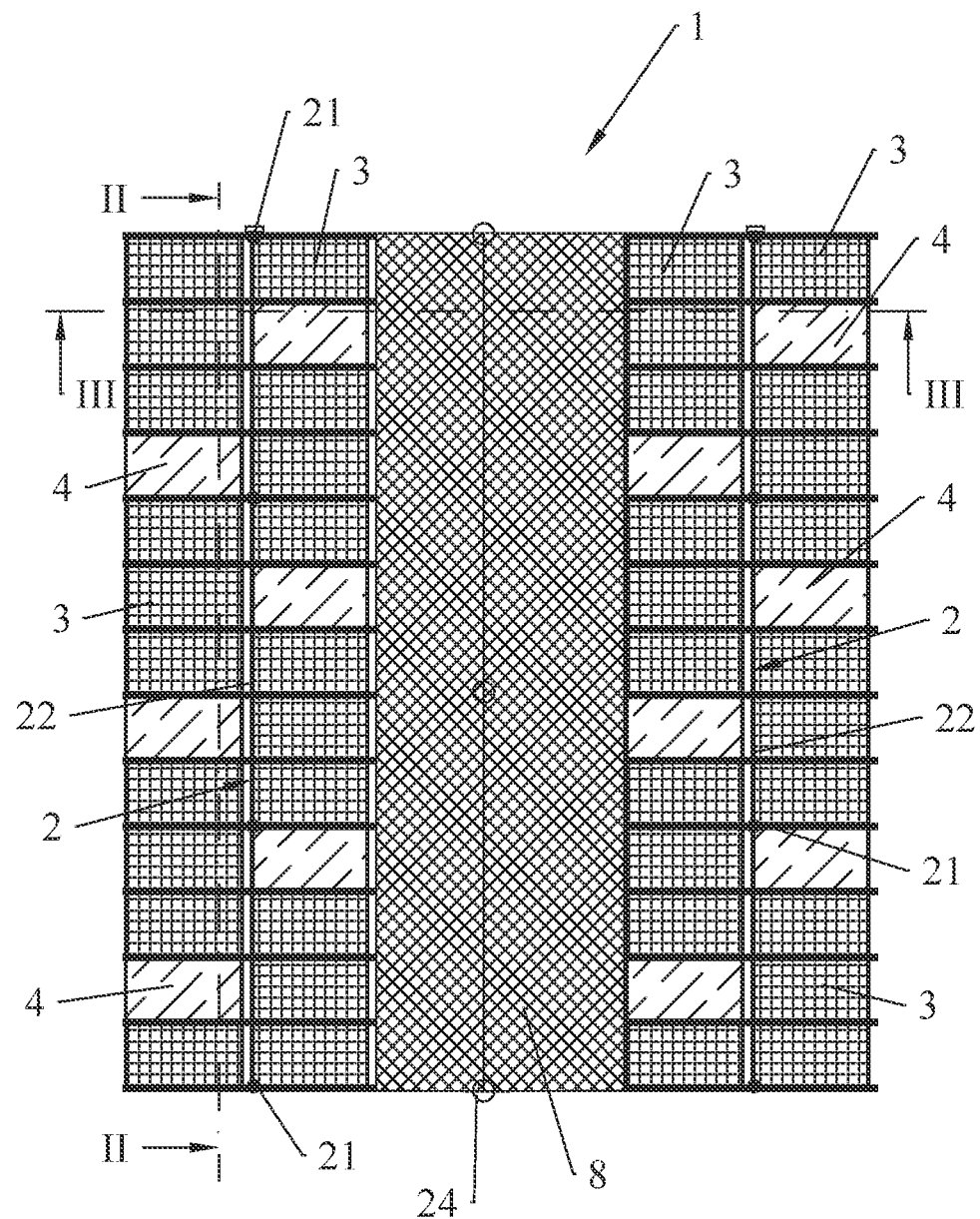
FIG. 1 shows a plan view of an agricultural photovoltaic structure according to the present invention.
Figure 2:
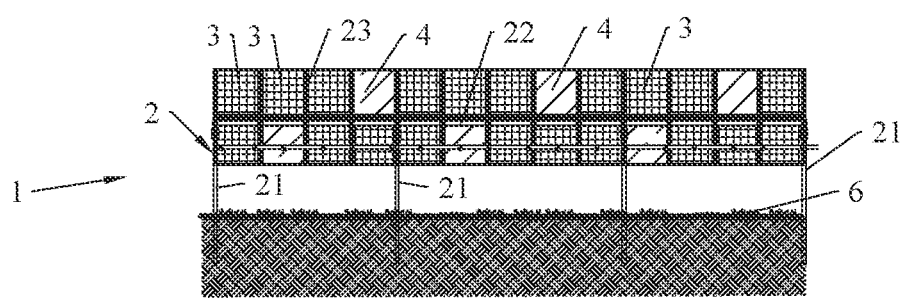
FIG. 2 shows a partial sectional view according to the line II-II of FIG. 1.

An agricultural photovoltaic structure 1 comprises two structures 2 able to support various components, panels 3 of the photovoltaic type, glass 4 able to diffuse light, preferably of the stratified type, and lighting means 5 preferably of the LED type.

Each structure 2 comprises vertical uprights 21, a horizontal beam 22 kept at a certain height above a portion of land 6 of the agricultural type by the vertical uprights 21, and a frame 23 able to accommodate the panels 3 and the glass 4.

The frame 23 defines the underlying covered surface of the land 6, partly by the panels 3 partly by the glass 4, allowing the diffusion of the light on the underlying land 6.

The agricultural photovoltaic structure 1 also comprises irrigation means 7, including nozzles able to both irrigate the underlying land 6 and cool the panels 3, an anti-hail net 8, and sensors able to detect a series of environmental parameters, such as, for example, light, humidity, temperature.

Control means of the agricultural photovoltaic structure 1 allow the need to activate the lighting means 5, the irrigation means 7 and to rotate the frames 23 with respect to the horizontal beams 22 in order to vary the orientation of the panels 3.

The anti-hail net 8 is kept open and suspended to protect the underlying land 6 between the two structures 2, in particular, it is attached to the mutually facing edges of the frames 23 and it is further supported by intermediate vertical uprights 24.

The data collection from the sensors, the management of the irrigation means 7 and the lighting means 5 are carried out by a software implemented by the control means.

The control means can be connected to several agricultural photovoltaic structures 1 or also placed at a considerable distance.

The nozzles are supplied by traditional means for supplying the irrigation means 7 of the land 6.

The electricity production of the panels 3 is channeled towards components (such as, for example, string boxes), which are commonly found on the market, before reaching first the solar inverters and then, the national transmission grid.

The agricultural photovoltaic structure 1 is conceived so as to favor the electricity production of the panels 3 and the agricultural production, both of the crops underlying the panels 3 and the crops underlying the glass 4.

The glass 4 have the object of evenly diffusing the sunlight for the underlying crops. The lighting means 5 allow increasing the agricultural production of these crops, providing more light to those, which have a greater need at particular times of the year.

The anti-hail net 8, besides protecting from extreme weather events, also has the object of shading the crops during the hottest times of the year, increasing the production thereof and reducing the water consumption thereof.

The nozzles have the object of cooling the panels 3 while the underlying crops are irrigated.

The control means, taking the data from the sensors and analyzing it through advanced algorithms, determine the right amount of water and light to be supplied to the crops, to maximize the agricultural production thereof despite the climatic conditions changing throughout the year.

Depending on the crops and the type of land, the structure 2 can be mono-axial or fixed.

Mono-axial are all those so-called mono-axial solar tracking structures, more precisely, those structures, which are capable of following the position of the sun from east to west, during the day, having, as the horizontal rotation axis, the north-south one. In this way, the panels 3 are constantly in the best angle possible with respect to the sun and this results in an increase in the productivity thereof, if compared to that of the panels 3 of a fixed structure.

Both these types of structure 2 are designed to accommodate both the glass 4 and the panels 3, both one-sided and two-sided, which can be found on the market.

The mono-axial type structure 2 has a number of vertical uprights 21 proportional to the length of the same structure 2. The horizontal beam 22 is constrained to the vertical uprights 21 through ball bearings. A motor causes the horizontal beam 22 to rotate and transmits the rotatory motion to the frames 23 and therefore to the single-sided or two-sided panels 3, and to the glass 4.

Advantageously, the panels 3 follow the movement of the sun, increasing the electricity produced of the production system with renewable sources.

In order to reduce to a maximum the shade of the structure on the two-sided panels 3, the panels 3 are preferably arranged with the short side thereof along the horizontal beam 22 as shown in FIG. 1.

Each structure 2 supports two rows of panels 3 and glass 4, one to the right and one to the left of the horizontal beam 22.

The overall extension of the short section of the structure 2 is, for example, about 5 m (meters).

As regards the dimension of the long section of the structure 2, this depends on various factors, such as, for example, the power of the panels 3, the electrical characteristics of the strings, the number of panels of glass 4 with respect to the number of panels 3, the characteristics of the land 6.

For example, a structure 2 accommodating forty two-sided type panels 3 and twelve panels of glass 4, is about 31 m long.

When the frame 23 is in the most inclined position (±55 degrees), the structure 2 simultaneously has a maximum height from the ground of about 4.6 m and a minimum height equal to 0.5 m. Whereas, when the frame 23 is in the horizontal position, the height thereof from the ground is about 2.5 m.

The foundation of the structures 2 is anchored to the ground by means of ballasts or by means of pillars beaten with a pile driver to a depth depending on the type of land 6 and on the maximum height of the structure 2.

Figure 3:
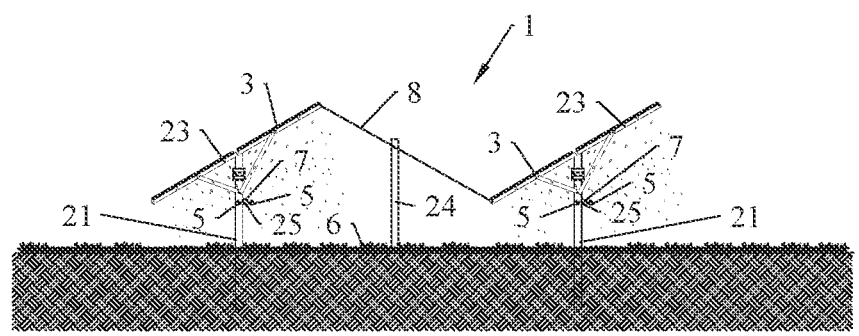
FIG. 3 shows a sectional view along line of FIG. 1.

As shown in FIG. 3, the vertical uprights 21 are also joined by a further beam 25, which has the object of supporting both the irrigation means 7, including the nozzles, and the lighting means 5.

The structure 2, of the fixed type also has a number of vertical uprights 21 proportional to the length thereof.

Alternatively, the inclination of the panels 3 remains fixed for the whole useful life of the agricultural photovoltaic structure 1. The angle of inclination of the panels 3 and the glass 4 depends on the characteristics of the land 6 and the latitude. Also in this case, in order to reduce the shade of the structure 2 on the two-sided type of photovoltaic panels as much as possible, the panels 3 are preferably arranged with the short side thereof along the horizontal beam 22.

Both for mono-axial and fixed-type structures 2, from a technical point of view, the optimum ratio between the number of panels of glass 4 and the number of panels 3 depends on the characteristics of the land and the climate: an optimum solution provides that the ratio between the glazed surface and that of the panels 3 is from 0.1 to 0.4.

Advantageously, the agricultural photovoltaic structure 1, in the different installation configurations, allows having light and environmental conditions, which are also suitable for the crop in the part of land underlying the panels 3.

One element that the crops cannot do without is water.

The agricultural photovoltaic structure 1 comprises irrigation means 7 controlled by the control means on the basis of the values detected by the humidity sensors present in the land 6.

Advantageously, the water is used first for cooling the panels 3, and only afterwards, for the purposes of irrigating the crops.

By nebulizing (or by means of forced circulation) part or all of the water against the lower part of each panel 3 by means of the nozzles, we have a temperature lowering with a consequent increase in power and, consequently, efficiency.

In fact, the panel 3 loses efficiency as the temperature increases.

Therefore, the described cooling of the panels 3 allows increasing both the efficiency and the producibility of the system by about 0.35% for each ° C. (degree centigrade) reduced in this way: by lowering the temperature of the panels from 50° C. to 35° C., for example, there is an increase in production of over 5%.

The water, which was used to cool the panels, will then fall to the ground, irrigating the crops present. The use of water for the benefit of the photovoltaic system does not imply any additional expense for water since the same water would nonetheless have been used for agricultural purposes.

Therefore, the cooling of the panels 3 takes place after the direct spraying, by means of the nozzles, on the lower part of the panels 3, wherein direct spraying means an emission of water of the nozzles towards the lower part of the panels 3, possibly also in spray form. The nozzles are directed towards the lower part of the panels 3 so that the water wets first the lower part of the panels 3 and then, ends up, by gravity, on the agricultural land.

The humidity of the land 6 below the agricultural photovoltaic structure 1 is monitored by means of humidity sensors in the ground, while the temperature sensors provide the control means with data about the temperature of the surface of the panels 3. Starting from this data, the control means process the best time to send the power on and power off signals of the irrigation means 7, so as to optimize the production of the agricultural photovoltaic structure 1, both in terms of energy and agricultural crops.

The control means have the object of managing the lighting means 5 and the irrigation means 7 of the panels 3.

The control means comprise a programmable logic controller (PLC), which receives data from the sensors, and, by virtue of advanced algorithms, sends power on or power off signals to the lighting means 5 and to the pumps of the irrigation means 7.

Among the sensors, which communicate with the control means, the most important are:
solarimeters, i.e., radiation sensors present both at the same level as the surface of the panels 3 and therebelow,
ground humidity sensors,
external temperature sensors and ground sensors,
panel 3 temperature sensors.

Based on the type of crop and on other environmental and ground conditions, other types of sensors could also be implemented from time to time. The algorithms of the control means are always adjusted according to the number, types and finally, positioning of all the sensors relating to the control means.

As stated previously, based on the number and type of these sensors, the control means could be sufficient for only one structure 2 or for a greater number of structures 2. In this last case, the box containing the programmable logic controller must be arranged at a point, which is as barycentric as possible with respect to the sensors. This box is accommodated at one of the two outer vertical uprights 2.

The main object of the anti-hail net 8 is to protect the crops in the event of extreme atmospheric events, such as violent hailstorms. Given that the hailstorms are generally accompanied by strong winds, the net must not be fixed only to the two parallel structures 2, but it must have its own additional support structure to which it is anchored by means of highly resistant cords and steel rods: thereto the use of the aforesaid additional vertical uprights 24 which are generally made of wood or iron and anchored directly to the ground 6 between the two structures 2 as shown in FIG. 3.

The arrangement and height of these additional vertical uprights 24 depends on the type of crop and land 6.

Therefore, these anti-hail nets 8 must be removable if necessary and they must also be resistant and elastic in order to adapt to both the load due to the hail and the possible rotatory movement in the case of a mono-axial system. This is to prevent the whole anti-hail net 8 from being damaged, and consequently, the underlying crops.

In addition to this main object, the anti-hail net 8 also serves other functions, such as, for example, protecting the crops from birds and shading the crops during the hot summer months.

In this way, the agricultural photovoltaic structure 1 is capable of protecting, from direct light and extreme weather events, both the cultivated land underlying the structures 2 of the panels 3 and the glass 4, and the one comprised between one structure 2 and the other.

Therefore, the agricultural photovoltaic structure 1 consists of a varying number of structures 2, frames 23, panels 3 and glass 4.

The innovative combination of different technologies, operating automatically by virtue of the wide network of sensors and of the management thereof of the control means, makes the agricultural photovoltaic structure 1 capable of:
producing electricity from a renewable source to reduce the greenhouse gas emissions, reducing, but only in a non-significant manner, the cultivatable surface of the land;
increasing the agricultural production by providing natural diffused light, and artificial light, if necessary, for all types of crops situated below the structures, which do not favor an excessive amount of direct sunlight;

protecting the agricultural production of all types of crops, both those situated below the structures and those between the structures, from extreme weather events, e.g., hail;

diminishing excessive evaporation of the crops underlying the structures and those between the structures, consequently reducing the need thereof for irrigation water;

cooling the panels 3, with a consequent increase in the electricity production thereof during crop irrigation;

also cultivating those lands, which are no longer suitable for cultivation due to drought, and those which are potentially at risk as a result of climate change.

The invention claimed is:

1. Agricultural photovoltaic structure of mono-axial type with a horizontal rotation axis., comprising at least one support structure, photovoltaic panels and diffusing light panels supported by the support structure, nozzles which irrigate an underlying agricultural land, a lighting device for the underlying agricultural land, and a programmable logic controller, wherein the support structure comprises at least one frame which supports side by side both the photovoltaic panels and the diffusing light panels creating a cover over the underlying agricultural land and for diffusing light on the underlying agricultural land by the diffusing light panels, the nozzles directly spray water on a part of the photovoltaic panels facing the underlying agricultural land, thus cooling the photovoltaic panels, the water then falling by gravity onto the underlying agricultural land, and the programmable logic controller activates the nozzles and the lighting device according to sensors, each support structure comprise vertical uprights and a horizontal beam supported by the vertical uprights, the photovoltaic panels are mounted with a short side along the horizontal beam which rotates by a motor thus transmitting a rotary motion to the frame and therefore to the photovoltaic panels and to the diffusing light panels, each support structure supports two rows of both photovoltaic panels and diffusing light panel, one to the right and one to the left of the horizontal beam, and each support structure comprises a further horizontal beam able to support both the nozzles and the lighting device.

2. The agricultural photovoltaic structure according to claim 1, wherein the agricultural photovoltaic structure comprises two support structures parallel to each other, and an anti-hail net which protects an otherwise uncovered portion of the underlying agricultural land included between the two support structures.

3. The agriculural photovoltaic structure according to claim 2, wherein the anti-hail net is kept open and suspended to protect the underlying agricultural land between the two supporting structures by attachments to facing edges of the at least one frame and by intermediate vertical uprights.

4. The agricultural photovoltaic structure according to claim 1, wherein a ratio between a surface of the diffusing light panels and a surface of the photovoltaic panels is between 0.1 and 0.4.

* * * * *